(12) United States Patent
Woods

(10) Patent No.: US 6,692,806 B2
(45) Date of Patent: Feb. 17, 2004

(54) DEVICE FOR DISPLAYING PHOTOGRAPHS, CERTIFICATES, COMPACT DISCS AND THE LIKE

(75) Inventor: Carey P. Woods, Plum City, WI (US)

(73) Assignee: Richard S. Werner, West Bend, WI (US)

(*) Notice: Subject to any disclaimer, the term of this patent is extended or adjusted under 35 U.S.C. 154(b) by 0 days.

(21) Appl. No.: 10/121,814

(22) Filed: Apr. 12, 2002

(65) Prior Publication Data
US 2002/0110659 A1 Aug. 15, 2002

Related U.S. Application Data

(63) Continuation-in-part of application No. 09/152,981, filed on Sep. 14, 1998, now Pat. No. 6,379,765.

(51) Int. Cl.$^7$ ................................................. A47G 1/06
(52) U.S. Cl. .................. 428/40.1; 40/702; 40/709; 40/722; 40/737; 40/771; 40/775; 40/776; 428/13; 428/14; 428/41.7; 428/41.8; 428/138; 428/192; 428/194

(58) Field of Search .................. 428/40.1, 13, 14, 428/41.7, 41.8, 192, 194, 138; 40/702, 709, 722, 737, 771, 775, 776

(56) References Cited

U.S. PATENT DOCUMENTS

| | | | |
|---|---|---|---|
| 4,393,612 A | 7/1983 | Clark | 40/152 |
| 4,413,434 A | 11/1983 | Rupert et al. | 40/10 R |
| 5,025,581 A | 6/1991 | Polzin | 40/159 |
| 5,533,288 A | 7/1996 | Lambert | 40/754 |

*Primary Examiner*—Nasser Ahmad
(74) *Attorney, Agent, or Firm*—Jansson, Shupe & Munger, Ltd.

(57) ABSTRACT

A device, used for holding and displaying items such as photographs, certificates, compact discs and the like, includes a coversheet having an outward side and an inward side and an edge. A foam sheet material has front and back sides with the front side being connected with respect to the coversheet such that the device includes an entry portion to a pocket for holding the item. The back side of such foam clings to a display surface in a removable and replaceable manner. A backing material may be positioned between the foam sheet material and the coversheet.

28 Claims, 6 Drawing Sheets

DEVICE FOR DISPLAYING PHOTOGRAPHS, CERTIFICATES, COMPACT DISCS AND THE LIKE

RELATED APPLICATIONS

This is a continuation-in-part of U.S. Pat. No. 6,379,765, filed on Sep. 14, 1998 by the inventor named herein, and issued on Apr. 30, 2002.

FIELD OF INVENTION

This invention relates generally to card, picture, sign and readable disc exhibiting and, more particularly to a device and method for holding and displaying articles such as photographs, certificates, compact discs and the like.

BACKGROUND OF INVENTION

People are always searching for ways to appropriately display articles such as pictures, photographs and certificates of award or recognition. For documents signifying important milestones such high school or college graduation, the attainment of professional license, or the attainment of significant recognition, expensive framing such as the traditional picture frame that is used for the wall mounting of articles is often employed. Such framing is also used to display pictures such as graduation or wedding photos.

This type of traditional framing is expensive and usually involves rigid three-dimensional structures that require some form of hooking device mounted on the wall working in tandem with a wire or protrusion attached to the back of the frame in order to hang the frame on to the surface of a wall. Another type of framing device utilizes a brace that extends from the back of the frame, thereby allowing the frame to stand on a level surface such as a desk or table top.

For certain needs, a shortcoming of both of these framing devices is that their relative cost prevents them from being widely used to display informal candid photographs of people, pets, or scenery taken during parties, vacations, or everyday occurrences. Many such photographs are displayed on a refrigerator, filing cabinet or locker using a magnet. Such method of display offers no form of protection for the article—nor is it particularly attractive aesthetically. This lack of protection results, in many cases, in some type of disfigurement of the displayed article, either in the form of torn or curled edges or damage to the face of the article.

Another form of informal display involves putting the article beneath a glass table or desk top or the clear cover sheet of a desk blotter. Such display is limited in that the article is usually visible only to the person sitting behind the desk or table.

Other types of inexpensive framing devices employ smooth, static cling film, tacks or tape to secure a photograph to a flat surface such as a wall. While inexpensive, tape or static cling film have a shortcoming in that either can lose its mounting properties over time. Also, when an adhesive is used, the adhesive may either leave a residue on or mar the mounting surface once the framing device is removed. Additionally, the static cling film can be difficult to work with in that it can bunch up and stick to itself, thereby making mounting difficult. And a framing device made with such film is not very sturdy and, therefore, not ideally suited for long-term use.

Still another inexpensive framing device is sold under the Magnetic FREEZ•A•FRAME™ name. Such device uses a smooth backing having magnetic properties. The display side of the magnetic backing is imprinted around the edges with some message such as "My Birthday," "Friends." or "I Love You." A clear protective sheet is heat sealed to the edges of the display side of the magnetic backing in such a manner that one of the edges remains open so that the photograph to be displayed can be slid in between the protective sheet and the backing. In addition to being sealed along the edges, the protective sheet is heat sealed on three sides at a position between the edge and the center of the backing sheet. This second seal provides a snug fit in which to secure a picture.

Because it utilizes a magnet, the FREEZ•A•FRAME™ device can only be displayed on a metallic surface. In addition, because the border of the FREEZ•A•FRAME™ device is prelabeled with a message for a particular occasion, the device is not "universal" in application; that is, it does not lend itself to use with a variety of types of articles to be displayed.

There has also long been a need for the convenient storage of readable discs, e.g., compact discs, digital versatile/video discs, cd roms. Typically, storage of such discs requires a hard case, such as a "jewel" case. Such cases are easy to lose and are not conveniently stored. Often, people purchase specially made shelves or towers to hold such cases. However, such shelves and towers take up a large amount of space. In addition, to find a disc a person must open up each jewel case to determine if the desired disc is inside.

An easy-to-use displaying device that addresses problems and shortcomings of earlier displaying devices would be an important advance in the art.

OBJECTS OF THE INVENTION

An object of the invention is to provide an improved displaying device for photographs, certificates, discs and the like that overcomes some of the problems and shortcomings of the prior art.

Another object of the invention is to provide an improved displaying device for photographs, certificates, discs and the like that is durable yet inexpensive.

Still another object of the invention is to provide an improved displaying device for photographs, certificates, discs and the like that is capable of adhering to a variety of metal and non-metal surfaces.

Another object of the invention is to provide an improved displaying device for photographs, certificates, discs and the like that is capable of adhering to non-planar surfaces.

Another object of the invention is to provide an improved displaying device for photographs, certificates, discs and the like that is reusable.

Another object of the invention is to provide an improved displaying device for photographs, certificates, discs and the like that may be removed from a first surface and then cling to a second surface.

Yet another object of the invention is to provide an improved displaying device for photographs, certificates, discs and the like that is capable of being removed from a mounting surface without marring or leaving a residue on the surface.

How these and other objects are accomplished will become apparent from the following descriptions and from the drawings.

SUMMARY OF THE INVENTION

The invention involves an improved device for displaying items such as photographs, certificates, discs and the like.

The displaying device is comprised of (a) a coversheet forming a viewing region and having inward and outward sides, an outer edge and an entry portion and (b) foam sheet material having front and back sides, and provides a pocket for receiving and holding a planar item for display through the viewing region. The front side of the foam sheet material is secured with respect to the coversheet at positions along the outer edge other than along the entry portion thereof. The back side of the foam sheet material is capable of clinging in a removable and replaceable manner to a display surface.

In one preferred embodiment the foam sheet material is located only at the positions along the outer edge and the pocket is formed by the coversheet and foam sheet material. In this embodiment the foam sheet material holds the planar item in registration with the device when the planar device is received in the pocket. It is preferred that the coversheet be translucent and have a frame imprinted on one of its sides. The frame preferably overlies the positions at which the foam sheet material is secured with respect to the coversheet. It is further preferred that device be flexible and capable of clinging to a cylindrical display surface.

In an alternate embodiment the coversheet includes an opening at the viewing region. The opening preferably has smaller dimensions than the planar item. In such an embodiment the coversheet may be opaque, since the item is viewed through the opening rather than through the coversheet.

The device includes foam sheet material which is capable of clinging to the display surface without use of adhesive and is capable of leaving no residue on the display surface when the foam sheet material is removed from the display surface.

The preferred device further includes a sheet of backing material which has first and second sides. The first side is preferably secured to the inward side along the outer edge and the second side is preferably secured to the foam sheet material. In such embodiment, the foam sheet material at least partially covers the second side and the pocket is formed by the sheet of backing material and the coversheet.

In another preferred embodiment the foam sheet material is a single piece which extends between the positions along the outer edge so that the pocket is formed by the coversheet and foam sheet material. In such a preferred embodiment, the foam sheet material preferably includes a laminate on its front side. The front side is preferably secured to the coversheet along its edge by an adhesive. The foam sheet material preferably holds the planar item in registration with the device when the planar device is received in the pocket.

In this embodiment the preferred coversheet is translucent and has a frame imprinted on one of its sides. The frame overlies the positions at which the foam sheet material is secured with respect to the coversheet so that those positions are hidden from a viewer.

The invention can also be described as a device for holding compact discs and similar planar items. Such device comprises (a) a coversheet having inward and outward sides, an outer edge and a slot for receiving a planar item and (b) foam sheet material having front and back sides. The device provides a pocket for receiving and holding the planar item. The front side is preferably secured with respect to the coversheet along the outer edge and the back side is preferably capable of clinging in a removable and replaceable manner to a display surface. The slot preferably defines a flap for overlying the planar item received in the pocket.

This preferred embodiment further includes a sheet of backing material having first and second sides. The first side is secured to the inward side along the outer edge and the second side is secured to the foam sheet material. It is further preferred that the sheet of backing material be a laminate on the foam sheet material. The laminate is preferably polypropylene.

In such an embodiment, the coversheet and the sheet of backing material may be integral. Thus the coversheet and the sheet of backing material are created by folding an integral sheet along a folding line so that the inward side and the first side face one another. The coversheet in this embodiment is preferably translucent.

Further details of the invention are set forth in the following detailed description and in the drawings.

DETAILED DESCRIPTION OF PREFERRED EMBODIMENTS

Figure 1:
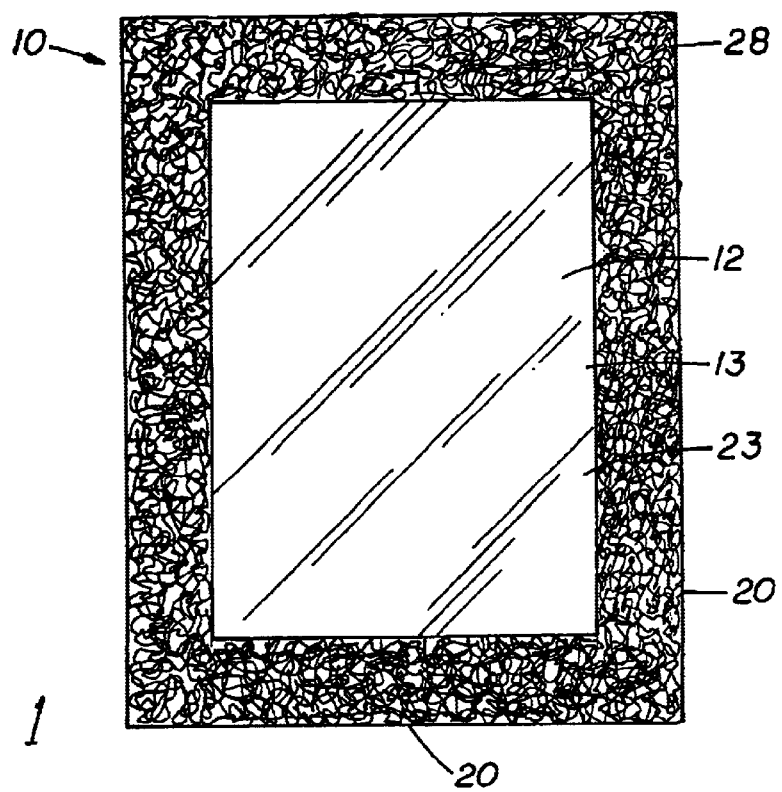
FIG. 1 is a front view of the displaying device showing the outward side of the coversheet including a frame.

The invention involves an improved displaying device 10 for holding and displaying items such as photographs, certificates, compact discs and the like. The displaying device 10 is comprised of a translucent or opaque coversheet 12 having both an outward side 11 that will be toward the viewer and an inward side 13 toward a foam sheet material 18. When an article such as a photo, certificate, disc or the like (not shown) is mounted in the device 10, the inward side 13 is also toward the article. The coversheet includes a viewing region through which the article is viewed. Both sides 11, 13 of the coversheet 12 have a common continuous edge 20.

Figure 2:
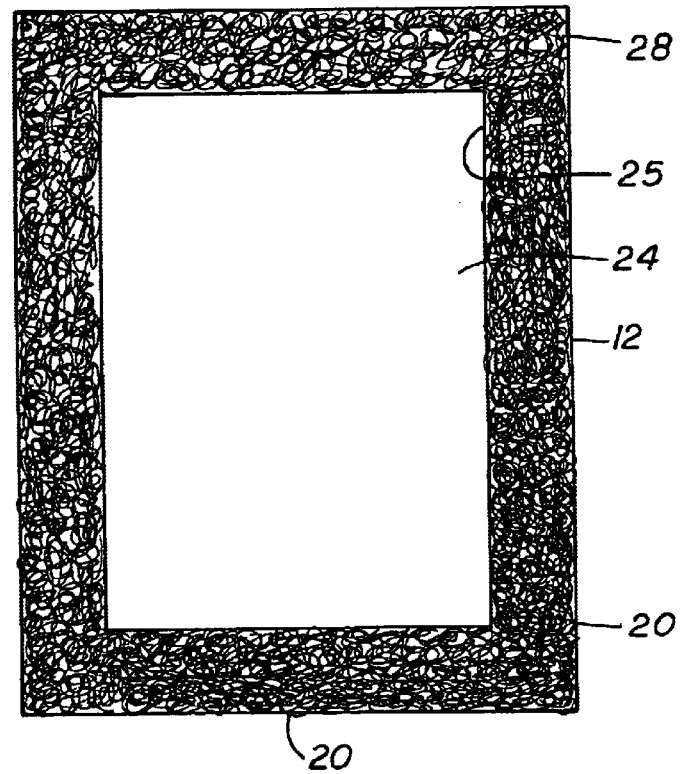
FIG. 2 is a front view of the displaying device showing the outward side of the coversheet including a frame and having an opening inside of the frame.

As shown in FIG. 1, coversheet 12 may have a frame 28 imprinted on it. If coversheet 12 is translucent, frame 28 may be printed on either the inward side 11 or the outward side 13. Coversheet 12 may extend from edge 20 to edge 20 and include a viewing region 23 as in FIG. 1, or it may include an opening 24 which serves as the viewing region as in FIG. 2. Opening 24 is defined by inner edge 25. Device 10 and coversheet 12 are shown having a rectangular shape, though they can be of any of the various geometrical shapes such as a circle, oval, triangle and square.

Figure 3:
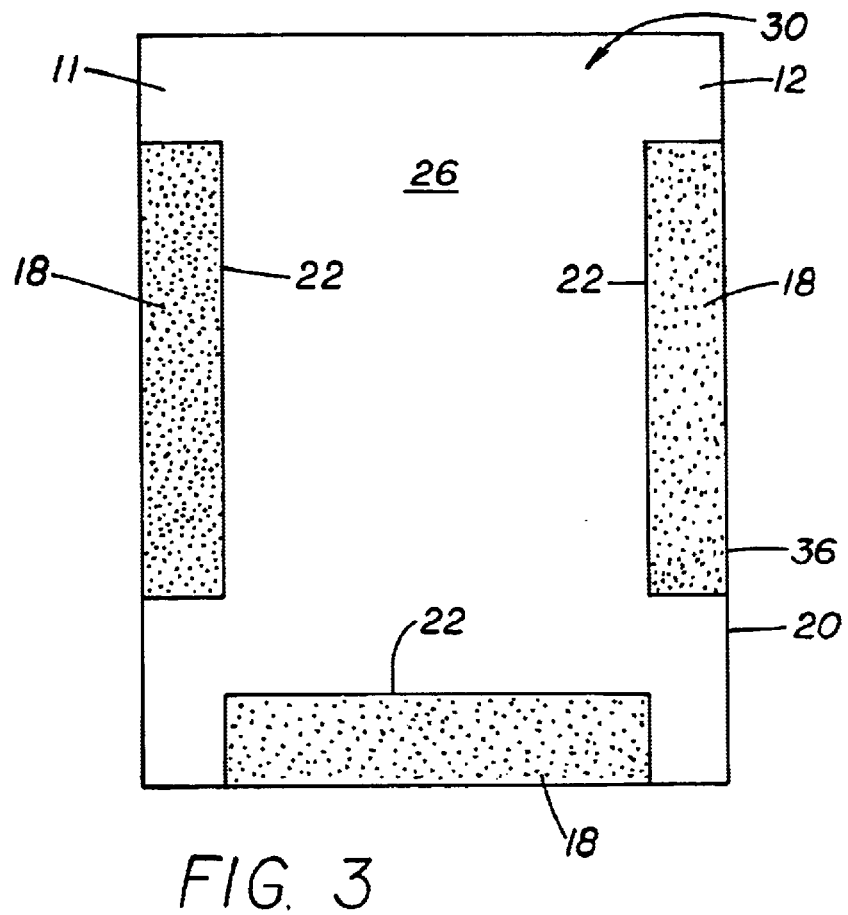
FIG. 3 is a rear view of the displaying device which has foam material attached directly to the coversheet.
Figure 4:
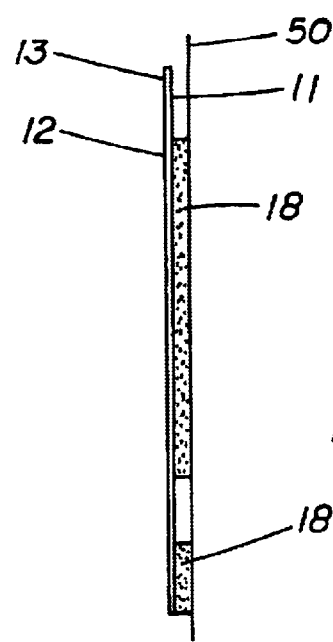
FIG. 4 is a side view of the displaying device shown in FIG. 3.

As shown in FIGS. 3 and 4 foam sheet material 18 is connected to inward side 11 of coversheet 12. Such connection is typically affected by adhesive, though other types of bonding may be used. Coversheet 12 may have an "image" of a frame 28 printed on it. Frame 28 preferably overlies the connection between foam sheet material 18 and coversheet 12 so that such connection is not seen when the device is viewed from beyond outward side 13. Frame 28 is very thin, i.e., the thickness of a layer of ink, and can fairly be said to be two-dimensional rather than three-dimensional. But the visual impression resembles that of a three-dimensional frame. Such imprinting can be accomplished using any known methods such as silk screening, printing, painting or the like.

Exterior edge 36 of foam sheet material 18 is preferably aligned with edge 20 of coversheet 12, though foam sheet material 18 may be placed toward the center of coversheet 12 along edge 20. Interior edges 22 of foam sheet material 18 hold the photograph, certificate or disc in registration with device 10 by providing boundaries to the pocket 26 in which the photograph, certificate or disc is received.

Foam sheet material 18 and coversheet 12 are connected in a manner which leaves a gap or entry portion 30 so that the photograph, certificate or disc may be inserted into pocket 26.

Figure 5A:
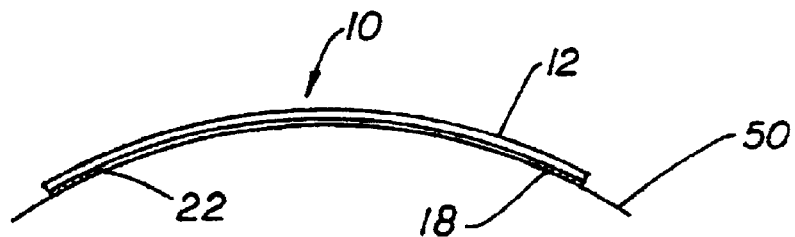
FIG. 5a is a top view of the displaying device having foam material attached directly to the coversheet and clinging to a non-planar display surface.

As shown in FIG. 5a, device 10 is able to cling to non-planar surfaces. This ability is due to the thin configuration of the coversheet and foam material 18 which provides sufficient cling force with minimal thickness. Foam sheet material 18 is capable of adhering to any one of several types of surfaces such as glass, metal or wood. A feature of the foam sheet material 18 contributing to the ability of the device 10 to adhere to a wide variety of surfaces is its compressibility.

The foam sheet material clings to the display surface without use of adhesive. Therefore, the foam sheet material may be removed from and placed on various display surfaces while retaining sufficient cling force to hold device 10 in an intended position. Furthermore, foam sheet material does not leave any residue on the display surface when it is removed.

Figure 5B:
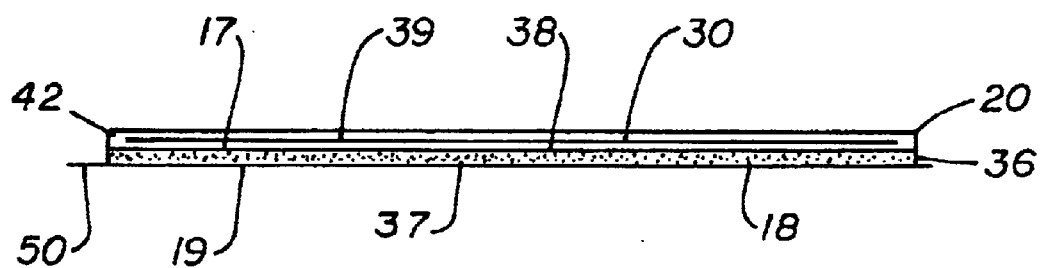
FIG. 5b is a top view of the displaying device having a backing layer between the foam material and the coversheet and clinging to a planar surface.
Figure 7:
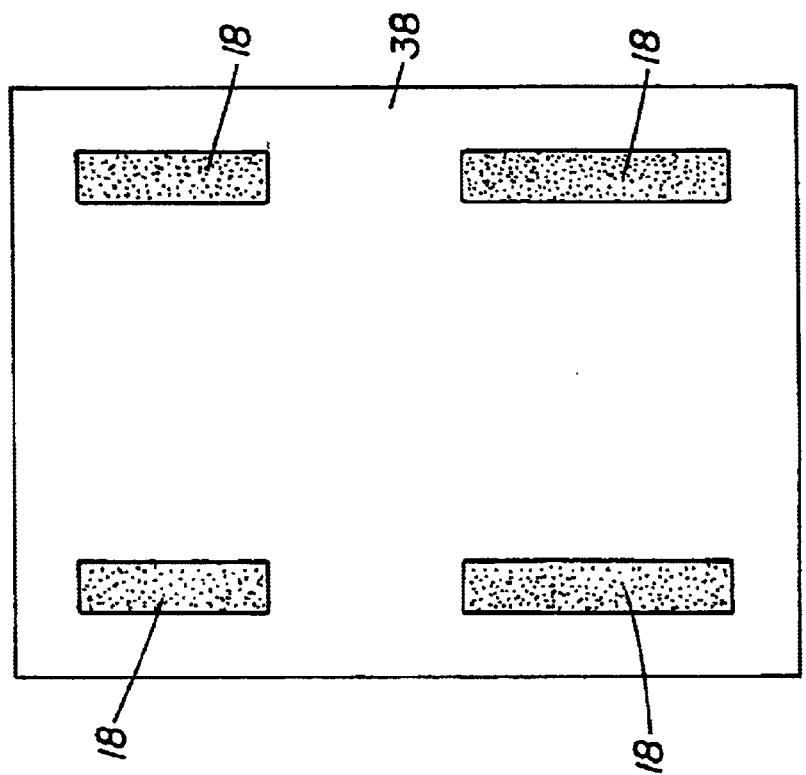
FIG. 7 is a rear view of the displaying device having a backing layer partially covered by foam sheet material.

FIGS. 5b and 7 show another embodiment of the invention which includes a sheet of backing material 38. Backing material 38 is positioned between coversheet 12 and foam sheet material 18. Backing material 38 is secured to coversheet 12 at 42 so that backing material 38 and coversheet 12 define the pocket for receiving the photograph, certificate, disc or similar planar item. In other words, in this embodiment foam sheet material 18 does not contact such planar item upon receipt in the pocket. As seen in FIG. 7, entry portion 30 lies between coversheet 12 and backing material 38.

Sheet of backing material 38 is preferably shaped to correspond to the geometrical shape of coversheet 12 and has a front side 39 (a side toward coversheet 12 in the finished device) and a back side 37. The sheet of backing material 38 is positioned so that a portion of its first side 39 contacts and adheres to the coversheet 12, preferably via an adhesive, and so that backing material 38 is in registry with the edge 36 of coversheet 12. The article to be displayed is inserted through entry portion 30 between coversheet 12 and the backing material 38.

Figure 6:
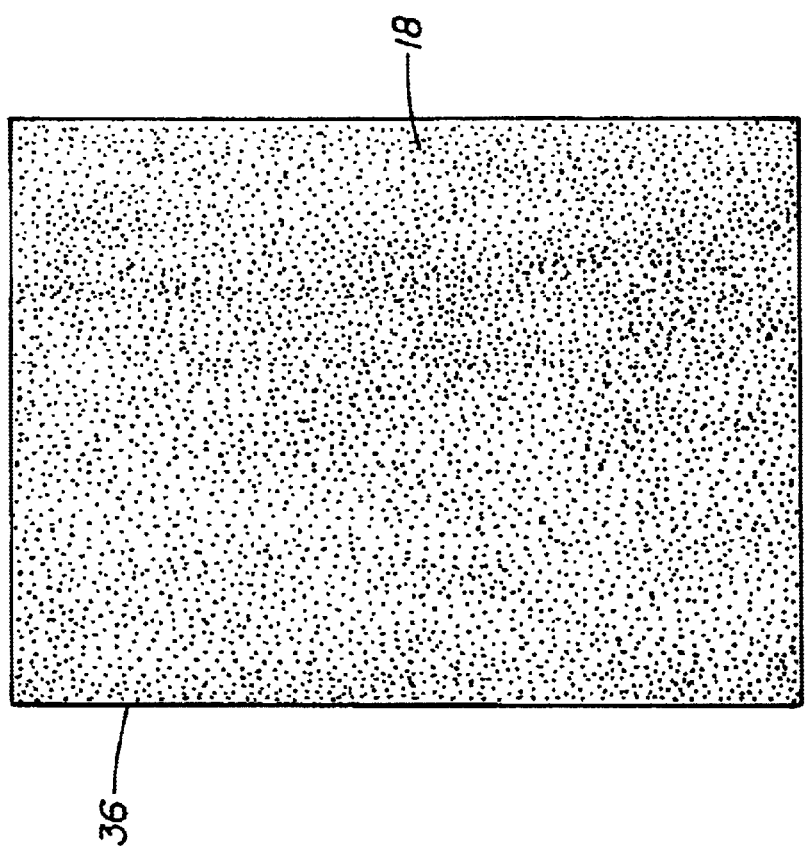
FIG. 6 is a rear view of the displaying device having a full sheet of foam material.

Backing material 38 may be completely covered by foam sheet material 18 as shown in FIG. 6, or only partially covered as shown in FIG. 7. Because foam sheet material 18 does not contact the received planar item in this embodiment, the configuration of foam sheet material 18 is unimportant as long as device 10 is able to cling to display surface 50 with sufficient force. Although not shown, this embodiment including backing material 38 is able to cling to non-planar surfaces just as the other embodiment.

As shown in FIG. 5b, the foam sheet material 18 has first and second sides 17 and 19, respectively. Second side 19 is capable of clinging to display surfaces. If foam sheet material 18 extends from edge to edge, as shown in FIG. 6, and backing material 38 is not included as a separate layer, then it is preferable that the first side 17 of the foam sheet material 18 be treated to make such side substantially non-clinging. Such treatment is intended to allow the planar item to be easily inserted into and removed from pocket 26. A preferred way to treat such side is to overlay it with a thin polymeric film. Such treatment allows the displayed article to slide freely between foam sheet material 18 and coversheet 12. In a preferred embodiment, backing material 38 is a laminate applied to foam sheet material 18, and more preferably is polypropylene. In such preferred embodiment, foam sheet material preferably completely covers coversheet 12 as in FIG. 6.

Figure 8:
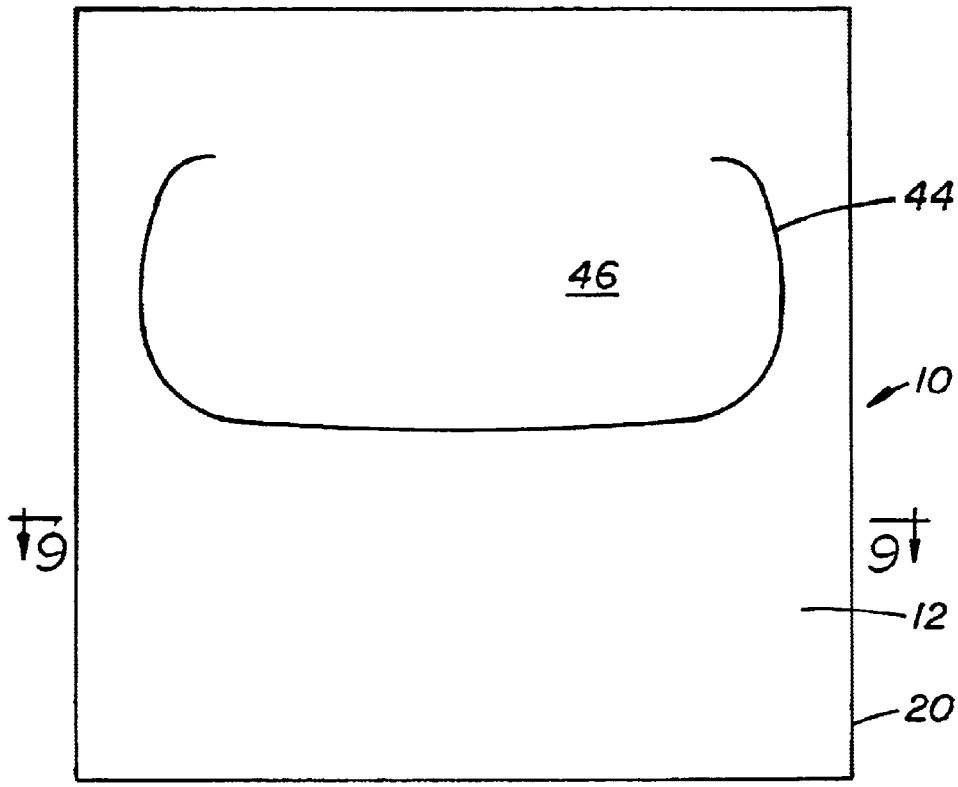
FIG. 8 is a front view of the displaying device having slotted coversheet for receiving a disc.
Figure 9:
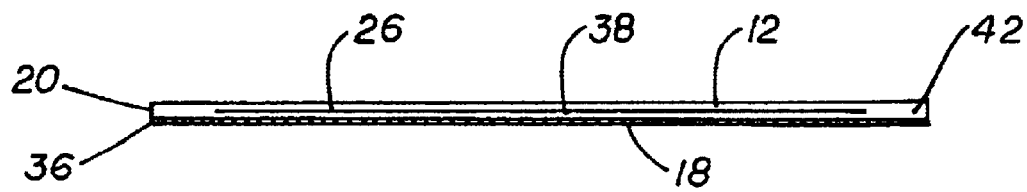
FIG. 9 is a cross section taken along line 9 in FIG. 8.

FIG. 8 shows the front view of device 10 including coversheet 12 with a slot 44 for receiving a planar item, preferably a disc such as a compact disc, digital versatile/video disc, cd-rom or the like. Slot 44 defines flap 46 which can be pulled out from coversheet 12 to allow the planar item to be inserted into the pocket. Flap 46 can then be repositioned adjacent to the planar item. FIG. 9 shows pocket 26 positioned between coversheet 12 and backing material 38.

Figure 10:
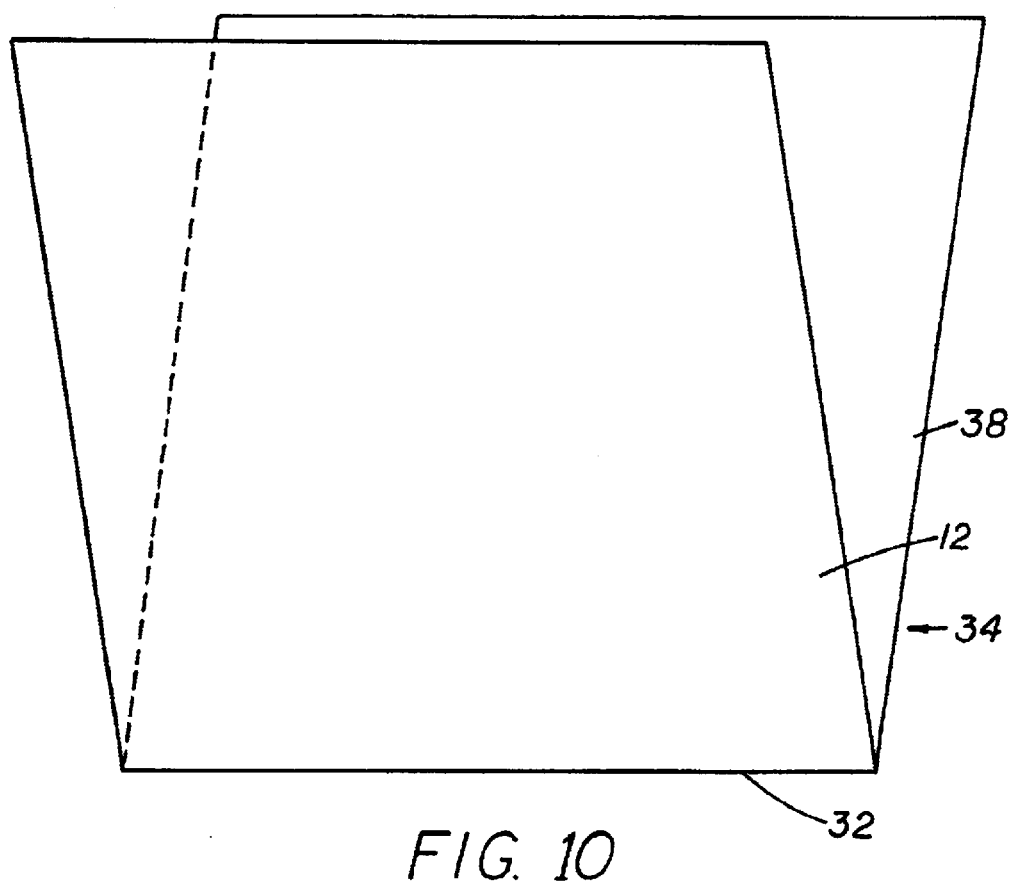
FIG. 10 is a prospective view of an integral sheet folded for use as a coversheet and sheet of backing material.

In the embodiment shown in FIG. 10 coversheet 12 and backing material 38 are formed from an integral sheet 34. Integral sheet 34 is folded at fold line 32 thereby defining a first portion which serves as coversheet 12 and a second portion which serves as backing material 38. The portions must be secured to one another only along two sides in addition to fold line 32 to form pocket 26.

A method for making the device 10 will now be described. There is no reason why the new device 10 cannot be made "one at a time." However, a highly preferred aspect of the method results in a number of devices 10 made substantially simultaneously.

Understanding of the following description will be aided by the following definitions. Coversheet material in sheet form has a length and width selected to accommodate the manufacture of several devices 10 therefrom. Sheet-form coversheet 12 is typically provided in the form of a stack of flat sheets, one atop the other.

Foam sheet material 18 in sheet form also has a length and width selected to accommodate the manufacture of several devices 10.

Coversheet material in web form is provided in a roll of fixed width and indeterminate length. Using the entire length of the web accommodates the manufacture of many more devices 10 than is possible from a single sheet. In this specification, "sheet" is used to denote either sheet-form or web-form material or foam.

A frame pattern 28, and preferably, several frame patterns 28 can be printed on one of the sides 11 or 13 of the sheet of coversheet material 12. A discontinuous layer of adhesive is applied to the inward side 13 of such material. That is, the layer of adhesive does not extend entirely around the edge 20 of the coversheet 12 or, in the case of "gang-manufactured" devices, around that portion of the coversheet material which will form such edge 20 in the finished device.

A foam sheet material 18 is then adhered to the adhesive. Substantially simultaneously, the coversheet material 12 and the foam sheet material 18 are cut into the desired shape(s), e.g., rectangular or oval framing device(s), by using a cutting die or cutting wheels.

In a more specific aspect of the method, the adhering step is preceded by the step of either treating the first side 17 of the foam sheet material 18 to be substantially tack-free, preferably by applying a substantially tack-free material or by adhering a backing material to foam sheet material 18. In another, more specific aspect of the method, the adhering step is preceded by the step of placing a release liner against the foam sheet material 18. Most preferably, treating and release liner placement are both used and a highly preferred treating material is polypropylene sheet or "laminate" applied to the first side 17 of the foam sheet material 18.

When gang-manufacturing the device 10, the printing step includes printing a plurality of frame patterns 28, and the applying step includes applying a plurality of discontinuous layers of adhesive to the inward side 13. The adhering step includes adhering a foam sheet material 18 to each of the plurality of discontinuous layers of adhesive, and the cutting step includes cutting, substantially simultaneously, the translucent material 12 and the foam sheet material 18 into a plurality of desired shapes. The plurality of desired shapes may be substantially identical to one another or may differ.

Characteristics of preferred materials will now be described. The free (uncompressed) thickness of the cling foam sheet material preferably ranges from about 1/64 inch (about 0.4 mm) to about 1/4 inch (about 6.35 mm). The free thickness of highly preferred cling foam is about 1/32 inch (about 0.79 mm) thick, is natural in color and has a density of about 20 pounds (about 9 kg). Density of the cling foam increases with decreasing thickness.

A highly preferred material to treat the first side 17 of the cling foam 18 to make it substantially tack-free is polypropylene sheet about 0.75 mil (about 0.002 cm) thick. Such material is preferably coated with WC-3 acrylic PSA adhesive. It should be appreciated that a wide variety of treating materials can be used. In the more preferred embodiment of the invention, the combined thickness of the sheet of cling foam and the layer of polypropylene is no more than 29 mils. (about 0.073 cm.).

Preferred coversheet material includes polypropylene, polyester, poly vinyl chloride (PVC), styrene and polycarbonate. Such material is preferably treated to accept printing. Coversheet material having a thickness in the range of 10 mil to 50 mil (about 0.025 cm to about 0.13 cm) is preferred with about 10 mil thickness being highly preferred.

Preferred adhesives include liquid adhesive, pressure-sensitive double coated tape, hot melt glue, and heat activated adhesive. Preferred thickness of such adhesive is from about 0.5 mil to about 15 mil (about 0.0013 cm. to about 0.04 cm.).

Preferred release liners include plastic film or paper with a thickness of from 0.5 mil to about 20 mil (about 0.0013 cm. to about 0.05 cm.). A more preferred liner is silicone coated paper about 7.5 mil (about 0.02 cm.) thick.

As used herein and when referring to the coversheet material, the term "translucent" means that the material will pass light therethrough with some attenuation or with little or no attenuation. In the former instance, such material might aptly be referred to as "frosted" or "clouded" while in the latter instance, the material would be considered "clear."

While the principles of the invention have been shown and described in connection with but a few embodiments, it is to be understood clearly that such embodiments are by way of example and are not limiting.

What is claimed is:

1. A device for displaying photographs, certificates and similar planar items, comprising:
    a coversheet forming a viewing region and having an entry portion and inward and outward sides with a common continuous outer edge and forming the outermost layer of the device, the outward side forming the outermost surface of the device, the outermost surface extending substantially continuously and completely from edge to edge; and
    foam sheet material having front and back sides, the front side being secured with respect to the coversheet at positions along the outer edge other than along the entry portion thereof, and the back side for clinging in a removable and replaceable manner to a display surface,
whereby a pocket is formed for receiving and holding a planar item for display through the viewing region.

2. The device of claim 1 wherein the foam sheet material is located only at the positions along the outer edge, the pocket being formed by the coversheet and foam sheet material.

3. The device of claim 2 wherein the foam sheet material holds the planar item in registration with the device when the planar device is received in the pocket.

4. The device of claim 2 wherein the coversheet is translucent and has a frame imprinted on one of its sides, the frame overlying the positions at which the foam sheet material is secured with respect to the coversheet.

5. The device of claim 2 wherein the device is flexible and clings to cylindrical display surfaces.

6. The device of claim 2 wherein the coversheet includes an opening at the viewing region, the opening having smaller dimensions than the planar item.

7. The device of claim 2 wherein the foam sheet material clings to the display surface without use of adhesive.

8. The device of claim 7 wherein the foam sheet material leaves no residue on the display surface when the foam sheet material is removed from the display surface.

9. The device of claim 1 further comprising a sheet of backing material having first and second sides, the first side being secured to the inward side along the outer edge and the second side being secured to the foam sheet material, and wherein the foam sheet material partially covers the second side, the pocket being formed by the sheet of backing material and the coversheet.

10. The device of claim 1 wherein the foam sheet material is a single piece which extends between the positions along the outer edge, the pocket being formed by the coversheet and foam sheet material.

11. The device of claim 10 wherein the foam sheet material includes a laminate on the front side.

12. The device of claim 11 wherein the laminate is secured to the coversheet by an adhesive.

13. The device of claim 10 wherein the foam sheet material holds the planar item in registration with the device when the planar device is received in the pocket.

14. The device of claim 10 wherein the coversheet is translucent and has a frame imprinted on one of its sides, the frame overlying the positions at which the foam sheet material is secured with respect to the coversheet.

15. The device of claim 10 wherein the device is flexible and clings to cylindrical display surfaces.

16. The device of claim 10 wherein the coversheet includes an opening at the viewing region, the opening having smaller dimensions than the planar item.

17. The device of claim 16 wherein the coversheet is opaque.

18. The device of claim 10 wherein the foam sheet material clings to the display surface without use of adhesive.

19. The device of claim 18 wherein the foam sheet material leaves no residue on the display surface when the foam sheet material is removed from the display surface.

20. A device for holding compact discs and similar planar items, comprising:

a coversheet having inward and outward sides with a common and continuous outer edge and forming the outermost layer of the device, the outward side forming the outermost surface of the device, the outermost surface extending substantially continuously and completely from edge to edge in substantially a single plane, the coversheet including a slot for receiving a planar item; and foam sheet material having front and back sides, the front side being secured with respect to the coversheet along the outer edge and the back side clinging in a removable and replaceable manner to a display surface, whereby a pocket is formed for receiving and holding the planar item.

21. The device of claim 20 further comprising a sheet of backing material having first and second sides, the first side being secured to the inward side along the outer edge and the second side being secured to the foam sheet material.

22. The device of claim 21 wherein the coversheet and the sheet of backing material are integral, the coversheet and the sheet of backing material being created by folding an integral sheet along a folding line so that the inward side and the first side face one another.

23. The device of claim 20 wherein the sheet of backing material is a laminate on the foam sheet material.

24. The device of claim 20 wherein the slot defines a flap for overlying the planar item received in the pocket.

25. The device of claim 20 wherein the foam sheet material is clings to the display surface without use of adhesive.

26. The device of claim 20 wherein the foam sheet material leaves no residue on the display surface when removed from the display surface.

27. The device of claim 20 wherein the coversheet is translucent.

28. A device for displaying photographs, certificates and similar planar items on a display surface, comprising:

a coversheet forming a viewing region and the outermost layer of the device, the coversheet having an entry portion and inward and outward sides with a common continuous outer edge, the outward side forming the outermost surface of the device, the outermost surface extending substantially continuously and completely from edge to edge in substantially a single plane; and foam sheet material having front and back sides, the front side being secured with respect to the coversheet at positions along the outer edge other than along the entry portion thereof such that a pocket is formed for receiving and holding a planar item for display through the viewing region, and the back side clinging in a removable and replaceable manner to the display surface, whereby attachment between the device and the display surface occurs without use of adhesive and removal of the device from the display surface leaves no residue on the display surface.

* * * * *